US012243395B2

(12) United States Patent
Kim et al.

(10) Patent No.: US 12,243,395 B2
(45) Date of Patent: Mar. 4, 2025

(54) MEDIUM HANDLING APPARATUS AND MEDIUM HANDLING METHOD

(71) Applicant: HYOSUNG TNS INC., Seoul (KR)

(72) Inventors: Jun Young Kim, Gyeonggi-do (KR); Jong Seong Park, Anyang-si (KR); Hyun Soo Jang, Suwon-si (KR)

(73) Assignee: Hyosung TNS Inc., Seoul (KR)

( * ) Notice: Subject to any disclaimer, the term of this patent is extended or adjusted under 35 U.S.C. 154(b) by 484 days.

(21) Appl. No.: 15/767,545

(22) PCT Filed: Oct. 11, 2016

(86) PCT No.: PCT/KR2016/011340

§ 371 (c)(1),
(2) Date: Apr. 11, 2018

(87) PCT Pub. No.: WO2017/065471

PCT Pub. Date: Apr. 20, 2017

(65) Prior Publication Data

US 2018/0300990 A1 Oct. 18, 2018

(30) Foreign Application Priority Data

Oct. 13, 2015 (KR) ........................ 10-2015-0142597

(51) Int. Cl.
*G07F 19/00* (2006.01)
*B65H 1/02* (2006.01)
(Continued)

(52) U.S. Cl.
CPC ........... *G07F 19/202* (2013.01); *B65H 1/025* (2013.01); *B65H 3/0653* (2013.01); *B65H 29/60* (2013.01);
(Continued)

(58) Field of Classification Search
CPC ..... G07F 19/202; G07F 19/203; G07D 11/20; G07D 11/14; G07D 11/18; G07D 11/165;
(Continued)

(56) References Cited

U.S. PATENT DOCUMENTS 4,883,183 A * 11/1989 Kimura .................. G07D 11/14 235/379
6,796,434 B2 * 9/2004 Kako ....................... B65H 7/02 209/534
(Continued)

FOREIGN PATENT DOCUMENTS

CN 102074067 A 5/2011
CN 102693577 A 9/2012
(Continued)

OTHER PUBLICATIONS

PCT International Search Report (with English Translation) & Written Opinion, International Application No. PCT/KR2016/011340, dated Dec. 30, 2016, 11 Pages.
(Continued)

*Primary Examiner* — Jeffrey A Shapiro
(74) *Attorney, Agent, or Firm* — WTA Patents

(57) ABSTRACT

Provided are a medium handling apparatus and method for, by using a temporary storage unit, performing a tallying task in an automated teller machine. The medium handling apparatus includes a deposit/withdrawal unit configured to separate each individual medium and accumulate the medium, a discrimination unit configured to discriminate whether the media are abnormal and types of the media, a medium storage unit including a plurality of recycling cassettes, a temporary storage unit configured to temporarily store media discriminated as normal media, and a conveyance path configured to convey the media. Media in each of the recycling cassettes are temporarily stored in the temporary storage unit to confirm the number of media remaining
(Continued)

in the recycling cassette, and the media in the temporary storage unit are conveyed back to and stored in the recycling cassette when the number of remaining media is sensed.

7 Claims, 7 Drawing Sheets

(51) Int. Cl.

| | |
|---|---|
| ***B65H 3/06*** | (2006.01) |
| ***B65H 29/60*** | (2006.01) |
| ***B65H 31/06*** | (2006.01) |
| ***B65H 83/02*** | (2006.01) |
| ***G07D 11/14*** | (2019.01) |
| ***G07D 11/165*** | (2019.01) |
| ***G07D 11/18*** | (2019.01) |
| ***G07D 11/20*** | (2019.01) |
| ***G07D 11/23*** | (2019.01) |
| ***G07D 11/40*** | (2019.01) |
| ***G07D 11/50*** | (2019.01) |
| *B65H 5/06* | (2006.01) |
| *B65H 43/00* | (2006.01) |

(52) U.S. Cl.
CPC ........... *B65H 31/06* (2013.01); *B65H 83/025* (2013.01); *G07D 11/14* (2019.01); *G07D 11/165* (2019.01); *G07D 11/18* (2019.01); *G07D 11/20* (2019.01); *G07D 11/23* (2019.01); *G07D 11/40* (2019.01); *G07D 11/50* (2019.01); *G07F 19/203* (2013.01); *B65H 1/027* (2013.01); *B65H 5/062* (2013.01); *B65H 43/00* (2013.01); *B65H 2402/441* (2013.01); *B65H 2402/45* (2013.01); *B65H 2405/331* (2013.01); *B65H 2405/332* (2013.01); *B65H 2701/1912* (2013.01)

(58) Field of Classification Search
CPC ........ G07D 11/23; G07D 11/40; G07D 11/50; B65H 31/06; B65H 29/60; B65H 83/025; B65H 3/0653; B65H 1/025; B65H 2405/332; B65H 2405/331; B65H 2402/441; B65H 1/027; B65H 5/062; B65H 43/00; B65H 2402/45; B65H 2701/1912; B65H 7/02; B65H 31/24
USPC .......................................................... 194/206
See application file for complete search history.

(56) References Cited

U.S. PATENT DOCUMENTS

| | | | | | |
|---|---|---|---|---|---|
| 8,272,563 | B1 * | 9/2012 | Folk | G07D 11/40 | 235/379 |
| 8,640,945 | B1 * | 2/2014 | McCormick | G07D 11/24 | 235/379 |
| 9,858,743 | B2 * | 1/2018 | Wakabayashi | B65H 3/0653 | |
| 10,467,843 | B1 * | 11/2019 | Moore | G07D 11/34 | |
| 2002/0014736 | A1 * | 2/2002 | Katou | B65H 83/025 | 271/126 |
| 2002/0088850 | A1 * | 7/2002 | Katou | B65H 31/20 | 235/379 |
| 2007/0210149 | A1 * | 9/2007 | Osterberg | G07D 11/60 | 235/379 |
| 2008/0156613 | A1 * | 7/2008 | Park | G07D 11/14 | 194/206 |
| 2008/0230981 | A1 * | 9/2008 | Iwami | B65H 83/025 | 271/153 |
| 2009/0134567 | A1 * | 5/2009 | Taniyama | G07D 11/16 | 271/225 |
| 2010/0025183 | A1 * | 2/2010 | Folk | G07D 11/25 | 194/200 |
| 2010/0218707 | A1 * | 9/2010 | Billet | G07D 11/18 | 232/1 D |
| 2010/0245043 | A1 * | 9/2010 | Doi | G07D 11/50 | 340/5.86 |
| 2011/0130870 | A1 * | 6/2011 | Aoji | G07D 11/40 | 700/218 |
| 2012/0024659 | A1 * | 2/2012 | Mizoro | G07D 11/50 | 194/206 |
| 2012/0031728 | A1 * | 2/2012 | Lee | G07F 19/203 | 194/342 |
| 2012/0125734 | A1 * | 5/2012 | Okamura | G07D 11/24 | 194/216 |
| 2012/0285787 | A1 * | 11/2012 | Hosokawa | G07D 11/40 | 194/206 |
| 2012/0285788 | A1 * | 11/2012 | Akamatsu | B65H 29/40 | 194/215 |
| 2013/0001040 | A1 * | 1/2013 | Iwamura | G07D 11/26 | 194/206 |
| 2013/0153361 | A1 * | 6/2013 | Iizuka | G07D 11/12 | 194/206 |
| 2014/0027355 | A1 * | 1/2014 | Kumagai | G07D 11/50 | 209/534 |
| 2014/0069769 | A1 * | 3/2014 | Kobayashi | G07D 11/00 | 194/206 |
| 2014/0144750 | A1 * | 5/2014 | Shimizu | G07D 11/36 | 194/206 |
| 2014/0216890 | A1 * | 8/2014 | Liu | G07F 19/205 | 194/351 |
| 2015/0187157 | A1 * | 7/2015 | Doi | G07D 11/25 | 194/206 |
| 2015/0251861 | A1 * | 9/2015 | Go | G07D 11/12 | 271/160 |
| 2015/0314977 | A1 * | 11/2015 | Takada | B65H 31/06 | 271/306 |
| 2015/0363991 | A1 * | 12/2015 | Yoon | B65H 33/00 | 700/232 |
| 2015/0371480 | A1 * | 12/2015 | Luo | B65H 83/02 | 271/1 |
| 2015/0379799 | A1 * | 12/2015 | Kim | G07F 19/20 | 194/350 |
| 2016/0163160 | A1 * | 6/2016 | Hosokawa | G07F 19/202 | 700/242 |
| 2016/0350995 | A1 * | 12/2016 | Mizuno | G07D 7/003 | |

FOREIGN PATENT DOCUMENTS

| | | | |
|---|---|---|---|
| JP | 2002-032831 | A | 1/2012 |
| JP | 2012-113366 | A | 6/2012 |
| JP | 2012-238137 | A | 12/2012 |
| KR | 10-1072671 | B1 | 10/2011 |
| KR | 10-1077515 | B1 | 10/2011 |
| KR | 10-2015-0059187 | A | 6/2015 |

OTHER PUBLICATIONS

The Korean Intellectual Property Office, Notification of Reason for Refusal, Korean Patent Application No. 10-2015-0142597, Feb. 18, 2022, 14 pages.

* cited by examiner

MEDIUM HANDLING APPARATUS AND MEDIUM HANDLING METHOD

TECHNICAL FIELD

The present invention relates to a medium handling apparatus and method, and more particularly, to a medium handling apparatus and method for tallying media such as banknotes, checks, etc. therein.

BACKGROUND ART

In general, an automated teller machine (ATM) includes a medium handling apparatus for processing a deposit or a withdrawal of medium such as a banknote, a check, and the like.

The medium handling apparatus includes a deposit/withdrawal unit having a medium dispenser and a medium receiver which include a plurality of rollers so that a customer may insert or take out media for a deposit or a withdrawal, a discrimination unit for discriminating whether the media deposited or withdrawn through the deposit/withdrawal unit are abnormal, a temporary storage unit for temporarily storing media distinguished by the discrimination unit to be normal media among media deposited through the deposit/withdrawal unit, a medium storage unit composed of a plurality of cassettes to store deposited media and dispense media contained therein, and a conveyance path for connecting the deposit/withdrawal unit, the discrimination unit, the temporary storage unit, and the medium storage unit to each other and conveying media.

A display part provided on a rear side of the ATM displays the number of media stored in the medium storage unit of related medium handling apparatus. The display part may display the number of remaining media in each medium storage unit.

In this case, the number of remaining media displayed in the display part may differ from the number of media that actually remain in the medium storage unit. For example, when two media are separated in a medium storage unit and pass through the discrimination unit, the discrimination unit may not recognize the two media. Then, the number of media that actually remain in the medium storage unit does not coincide with the number of remaining media displayed in the display part.

Therefore, a teller should perform a tallying task to examine whether the number of remaining media displayed in the display part coincides with the number of media that actually remain in the medium storage unit. Such a tallying task involves separating each individual medium stored in the medium storage unit, determining the number of media by passing the separated media through the discrimination unit, and then storing the media in another medium storage unit. To perform the tallying task, the other medium storage unit should be empty.

In general, an ATM includes a supplementary/retrieval cassette to refill or retrieve media, and it is possible to perform the tallying task of determining the number of media remaining in a medium storage unit by using an empty supplementary/retrieval cassette.

However, in the case of an ATM which includes no supplementary/retrieval cassette, a teller must install an empty cassette in the ATM and then perform the tallying task. Therefore, the tallying task is inconvenient and time consuming.

Korean Patent Publication No. 10-2013-0075483 "Apparatus for Bill Receiving and Dispensing and the Method Thereof" discloses technology in which a supplementary/retrieval storage is used to perform the aforementioned tallying task. However, in the case of an apparatus having no supplementary/retrieval storage, it is difficult to perform the tallying task.

DISCLOSURE

Technical Problem

The present invention is directed to providing a medium handling apparatus and method for, by using a temporary storage unit, performing a tallying task even when there is no empty cassette in an automated teller machine (ATM).

Technical Solution

In order to achieve the aspects mentioned above, a medium handling apparatus includes a deposit/withdrawal unit configured to have a separator for separating each individual medium in an internal space and an accumulator for loading the medium into the internal space, a discrimination unit configured to discriminate whether media are abnormal and type of the media, a medium storage unit including a plurality of recycling cassettes for storing deposited media or media to be withdrawn, a temporary storage unit configured to temporarily store media discriminated as a normal media by the discrimination unit when a deposit is made; and a conveyance path configured to connect the deposit/withdrawal unit, the discrimination unit, the temporary storage unit, and the medium storage unit to each other and convey the media, wherein media in each of the recycling cassettes are temporarily stored in the temporary storage unit to confirm the number of media remaining in the recycling cassette, and the media in the temporary storage unit are conveyed back to and stored in the recycling cassette when the number of remaining media is sensed.

Various types of media may be stood upright and arranged in a horizontal stack in the temporary storage unit.

The temporary storage unit may include a separator/accumulator for accumulating the media therein and separately conveying the accumulated media to the conveyance path, and the separator/accumulator is provided at a position close to the deposit/withdrawal unit such that the temporary storage unit is extendable into a clearance on a side opposite to a side at which the deposit/withdrawal unit is positioned.

The conveyance path may include a first conveyance path configured to connect the separator of the deposit/withdrawal unit and the discrimination unit, a second conveyance path configured to connect the discrimination unit and the temporary storage unit, a third conveyance path configured to connect the accumulator of the deposit/withdrawal unit and the second conveyance path, a first connective conveyance path diverged from the first conveyance path and connected downward to a front side of the medium storage unit, a second connective conveyance path diverged from the second conveyance path and connected downward to a rear side of the medium storage unit; and a fourth conveyance path which is positioned above the plurality of recycling cassettes, has a front end and a rear end connected, respectively, to the first connective conveyance path and the second connective conveyance path, and is connected to each of the plurality of recycling cassettes.

The deposit/withdrawal unit, the discrimination unit, the temporary storage unit, and the first to third conveyance paths are provided in an upper module, the plurality of recycling cassettes and the fourth conveyance path are provided in a lower module under the upper module, and the first connective conveyance path and the second connective conveyance path are provided over the upper module and the lower module.

The medium storage unit may include a reject cassette configured to store media discriminated as reject medium by the discrimination unit or media which have been loaded into the deposit/withdrawal unit but not taken out by a user, the recycling cassettes are positioned in the front side of the medium handling apparatus where the deposit/withdrawal unit is located, and the reject cassette is positioned under the second connective conveyance path behind the recycling cassettes.

The temporary storage unit may have an upward-opening door, and when the door is opened upward, it is possible to accumulate the media in an internal space of the temporary storage unit.

The number of remaining media may be sensed by the discrimination unit or sensed when a sensor provided in the conveyance path senses whether the media are passed through.

A medium handling method of a medium handling apparatus including a deposit/withdrawal unit into or from which media are inserted or taken out for a deposit or a withdrawal, a discrimination unit for discriminating whether the media are abnormal and type of the media, a medium storage unit including a plurality of recycling cassettes for storing the media, a temporary storage unit for temporarily storing media discriminated as normal media by the discrimination unit when a deposit is made, and a conveyance path for connecting the deposit/withdrawal unit, the discrimination unit, the temporary storage unit, and the medium storage unit to each other and conveying the media, the method comprising: a) inputting, by a user, a signal for tallying the remaining number of media stored in each of the recycling cassettes, b) separating each individual medium and conveying the medium from the recycling cassette to the discrimination unit, discriminating the media through the discrimination unit, and storing the number of media in a controller, c) storing the media passed through the discrimination unit in the temporary storage unit, d) when all the media of the recycling cassette, which is a tallying target, have been stored in the temporary storage unit, sensing the number of media by separating again and passing through the discrimination unit the media of the temporary storage unit and then storing the media in the recycling cassette; and e) notifying a user of the sensed number of media.

When the user wants to refill the recycling cassette with media, inserting the media into the deposit/withdrawal unit, separating each individual inserted media, storing normal media in the temporary storage unit after being discriminated through the discrimination unit, and then storing, in the recycling cassette, media stored in the temporary storage unit.

The medium storage unit includes a reject cassette configured to store media discriminated as reject medium by the discrimination unit or media which have been loaded into the deposit/withdrawal unit but not taken out by a user, the conveyance path may include a first conveyance path connecting a separator of the deposit/withdrawal unit and the discrimination unit, a second conveyance path connecting the discrimination unit and the temporary storage unit, a first connective conveyance path diverged from the first conveyance path and connected downward to a front side of the medium storage unit, and a second connective conveyance path diverged from the second conveyance path and connected downward to a rear side of the medium storage unit, and while the deposit/withdrawal unit is used to refill the recycling cassette with the media, media discriminated as reject medium by the discrimination unit are passed through the second conveyance path and the second connective conveyance path and stored in the reject cassette.

The temporary storage unit may have an upward-opening door, and further comprising, when the user wants to refill the recycling cassette with media, opening the door, inserting the media into an internal space of the temporary storage unit, separating each individual inserted media, and storing, in the recycling cassette, media discriminated as normal media by the discrimination unit.

The medium storage unit includes a reject cassette configured to store media discriminated as reject medium by the discrimination unit or media which have been loaded into the deposit/withdrawal unit but not taken out by a user, the conveyance path includes a first conveyance path connecting a separator of the deposit/withdrawal unit and the discrimination unit, a second conveyance path connecting the discrimination unit and the temporary storage unit, a first connective conveyance path diverged from the first conveyance path and connected downward to a front side of the medium storage unit, and a second connective conveyance path diverged from the second conveyance path and connected downward to a rear side of the medium storage unit, and when a withdrawal request signal is input by a user, the media in the recycling cassettes are separated and conveyed to the discrimination unit, and the media discriminated as reject medium by the discrimination unit is passed through the second conveyance path and the second connective conveyance path and stored in the reject cassette.

Advantageous Effects according to exemplary embodiments of the present invention, by using a temporary storage unit, it is possible to perform a tallying task even when there is no empty cassette in an ATM, such that the internal space of the ATM can be efficiently used.

Also, since a user need not use an empty cassette to perform a tallying task, it is possible to perform a tallying task with ease and improve work efficiency.

Further, since a door is provided on an upper side of a temporary storage unit, it is possible to readily refill the temporary storage unit with media, and a user's convenience is improved.

Figure 1:
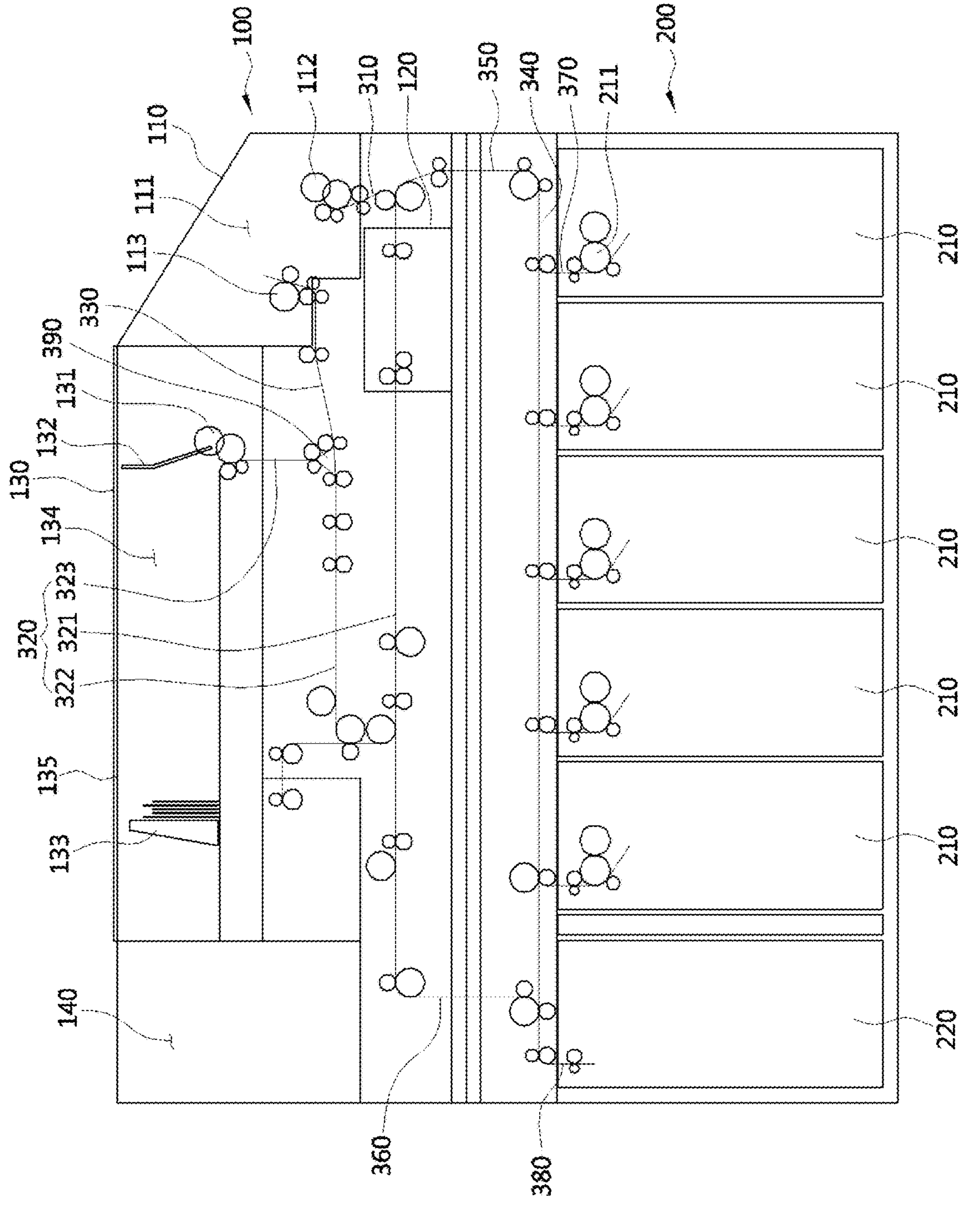
FIG. 1 is a diagram showing a configuration of a medium handling apparatus according to an exemplary embodiment of the present invention.

| *Description of Reference Numerals* |
|---|
| 100: upper module |
| 110: deposit/withdrawal unit |
| 111, 134: internal space |
| 112: separator |
| 113: accumulator |
| 120: discrimination unit |
| 130: temporary storage unit |
| 131: separator/accumulator |
| 132: front plate |
| 133: rear plate |
| 135: door |
| 140: clearance |
| 200: lower module |
| 210: recycling cassette |
| 220: reject cassette |
| 310: first conveyance path |
| 320: second conveyance path |
| 321: second lower conveyance path |
| 322: second upper conveyance path |
| 323: upper connective conveyance path |
| 330: third conveyance path |
| 340: fourth conveyance path |
| 350: first connective conveyance path |
| 360: second connective conveyance path |

BEST MODE FOR CARRYING OUT THE INVENTION

Hereinafter, a structure and operation of an exemplary embodiment of the present invention will be described in detail with reference to the accompanying drawings.

Referring to FIG. 1, a medium handling apparatus according to an exemplary embodiment of the present invention includes a deposit/withdrawal unit 110 in which a separator 112 for separating each individual medium in an internal space 111 and an accumulator 113 for loading media into the internal space 111 are provided, respectively, at a front portion and a rear portion thereof, a discrimination unit 120 for discriminating whether the media is abnormal and type of the medium, a medium storage unit including a plurality of recycling cassettes 210 for storing deposited media or a media to be withdrawn, a temporary storage unit 130 for temporarily storing media which have been discriminated as a normal media by the discrimination unit 120 when a deposit is made, and conveyance paths 310 to 380 for connecting the deposit/withdrawal unit 110, the discrimination unit 120, the temporary storage unit 130, and the medium storage unit to each other and conveying the media. The media include a check and a banknote.

The deposit/withdrawal unit 110 is a space into which media is loaded for a deposit or in which a number of media is accumulated for a withdrawal. The deposit/withdrawal unit 110 provides the separator 112 for separating each individual media inserted into the internal space 111 on the conveyance path 310, and the accumulator 113 for accumulating media conveyed through the conveyance path 330 in the internal space 111. The internal space 111 may be divided into a plurality of spaces by one or more partitions.

Each of the separator 112 and the accumulator 113 is composed of a plurality of opposing rollers and separates or accumulates media by rotation of the rollers. The separator 112 includes a pickup roller for separating each individual media.

The discrimination unit 120 discriminates whether media conveyed along the conveyance paths 310 and 321 is abnormal and type of the medium. The discrimination unit 120 includes a conveyance path for conveying media therein. In the conveyance path, a driver which is driven so that media may be conveyed in two directions is provided, and the conveyance path is configured so that media may be discriminated regardless of conveyance direction when the media is conveyed in the two directions.

In the discrimination unit 120, sensing means such as an image sensor, a two-sheet sensor, etc. are provided. The discrimination unit 120 senses media passing through the conveyance paths 310 and 321 and simultaneously scans images of the media, thereby discriminating whether the conveyed media is counterfeit, type of the medium, and whether the media has been damaged, and transmitting detected information to a controller.

The temporary storage unit 130 temporarily stores the media distinguished by the discrimination unit 120 when deposited media is counted, and discharges the temporarily stored media to the conveyance paths 323 and 322 when the deposited media is received.

A separator/accumulator 131 is provided on an entrance side of the temporary storage unit 130, that is, a position close to the deposit/withdrawal unit 110 so that media may be accumulated or separated. The separator/accumulator 131 is composed of a pickup roller having a circumferential surface on which a rubber member is provided to separate each individual medium accumulated in the internal space 134, a feed roller for applying conveyance power to the each individual medium separated by the pickup roller, and a guide roller installed opposite to the feed roller and preventing media from being separated in pairs.

The temporary storage unit 130 includes a front plate 132 and a rear plate 133 so that media is stood upright and arranged in a horizontal stack in the internal space 134. The temporary storage unit 130 has a rectangular shape whose cross-section is long in a front-to-back direction as shown in FIG. 1.

The front plate 132 is provided above the separator/accumulator 131 to guide accumulation of media when the media is accumulated in the internal space 134, and the rear plate 133 is provided behind the front plate 132 so that media is accumulated standing upright between the rear plate 133 and the front plate 132.

The rear plate 133 is movable forward or backward according to the number of media accumulated in the internal space 134.

In FIG. 1, the front indicates the right side on which the deposit/withdrawal unit 110 is provided, and the rear indicates the opposite side, that is, the left side at which a clearance 140 is positioned.

A door 135 for opening or closing the internal space 134 is provided on the upper side of the temporary storage unit 130. When the door 135 is opened, a user may accumulate media in the internal space 134 or take out media accumulated in the internal space 134.

The clearance 140 may be formed behind the temporary storage unit 130. In this case, it is easy to increase the capacity of the temporary storage unit 130 by increasing the size in a rearward direction, which is a direction opposite to the deposit/withdrawal unit 110. In particular, when the temporary storage unit 130 is used to perform a media tallying task according to the present invention, the temporary storage unit 130 may have a capacity large enough to accumulate all media stored in at least one recycling cassette 210.

The conveyance paths 310 to 380 includes the first conveyance path 310 connecting the separator 112 of the deposit/withdrawal unit 110 and the discrimination unit 120, the second conveyance path 320 connecting the discrimination unit 120 and the temporary storage unit 130, the third conveyance path 330 connecting the accumulator 113 and the second conveyance path 320, the first connective conveyance path 350 diverged from the first conveyance path 310 and connected downward to the front side of the medium storage unit, the second connective conveyance path 360 diverged from the second conveyance path 320 and connected downward to the rear side of the medium storage unit, and the fourth conveyance path 340 which is positioned above the plurality of recycling cassettes 210, has a front end and a rear end connected, respectively, to the first connective conveyance path 350 and the second connective conveyance path 360, and is connected to each of the plurality of recycling cassettes.

The second conveyance path 320 is composed of the second lower conveyance path 321 extending in a horizontal direction from the left end of the discrimination unit 120, the second upper conveyance path 322 provided above and approximately in parallel with the second lower conveyance path 321, and the second upper connective conveyance path 323 connecting the right end of the second upper conveyance path 322 to the separator/accumulator 131 of the temporary storage unit 130. The lefts ends of the second lower conveyance path 321 and the second upper conveyance path 322 are connected. The second conveyance path 320 is driven so that notes may be conveyed in the two directions.

Media conveyed through the second upper conveyance path 322 and the second upper connective conveyance path 323 are accumulated in the internal space 134 of the temporary storage unit 130 by the separator/accumulator 131, and the media accumulated in the internal space 134 are each individually separated by the separator/accumulator 131 and conveyed to any one of the second upper conveyance path 322 and the third conveyance path 330.

The third conveyance path 330 diverges from a connection point between the second upper conveyance path 322 and the second upper connective conveyance path 323 and is connected to the accumulator 113 of the deposit/withdrawal unit 110. Media conveyed through the third conveyance path 330 are accumulated in the internal space 111 of the deposit/withdrawal unit 110 by the accumulator 113.

A three-way switch gate 390 is provided at a point where the second upper conveyance path 322, the second upper connective conveyance path 323, and the third conveyance path 330 meet. Therefore, when a direction of the three-way switch gate 390 is changed, the second upper conveyance path 322 and the second upper connective conveyance path 323 are connected, the second upper conveyance path 322 and the third conveyance path 330 are connected, or the second upper connective conveyance path 323 and the third conveyance path 330 are connected.

The first connective conveyance path 350 diverges from the first conveyance path 310 to connect the right side of the discrimination unit 120 with the fourth conveyance path 340, and as a lower part of the deposit/withdrawal unit 110, has a length in a vertical direction of a front portion of an automated teller machine (ATM).

The second connective conveyance path 360 is positioned in a rear portion of the ATM. The second connective conveyance path 360 has a shape which diverges from the left end of the second lower conveyance path 321, extends in a horizontal direction, and is bent downward at the end of the horizontal portion, and is connected to the left end of the fourth conveyance path 340.

The length of the fourth conveyance path 340 is in the front-to-back direction. The front end of the fourth conveyance path 340 is connected to the first connective conveyance path 350, and the rear end is connected to the second connective conveyance path 360. There are cassette connective conveyance paths 370 and 380 diverged downward from the second connective conveyance path 360 and connected to the plurality of recycling cassettes 210 and a reject cassette 220, respectively.

The medium storage unit includes the plurality of recycling cassettes 210 and the reject cassette 220.

The recycling cassettes 210 function to accumulate and store deposited media therein, and to separate each individual medium to be withdrawn and convey the separated media to the conveyance path 340 in response to a withdrawal signal. The recycling cassettes 210 may be composed of a plurality of cassettes for storing identical or different types of media. When a plurality of different types of media are handled, each cassette may be configured to store the plurality of types of media or one type of medium.

Separators/accumulators 211 for accumulating or separating each individual medium are provided at the insert opening of the recycling cassettes 210.

The reject cassette 220 is provided behind the recycling cassettes 210 to store media which have been discriminated as reject medium by the discrimination unit 120 or lost and retrieved media which have not been taken out by a user from the deposit/withdrawal unit 110.

The deposit/withdrawal unit 110, the discrimination unit 120, the temporary storage unit 130, and the first to third conveyance paths 310, 320, and 330 constitute an upper module 100. The plurality of recycling cassettes 210, the reject cassette 220, and the fourth conveyance path 340 constitute a lower module 200 under the upper module 100. The first connective conveyance path 350 and the second connective conveyance path 360 are provided over the upper module 100 and the lower module 200.

Medium conveyance paths in a handling apparatus according to an exemplary embodiment of the present invention will be described below with reference to FIGS. 2 to 7.

Figure 2:
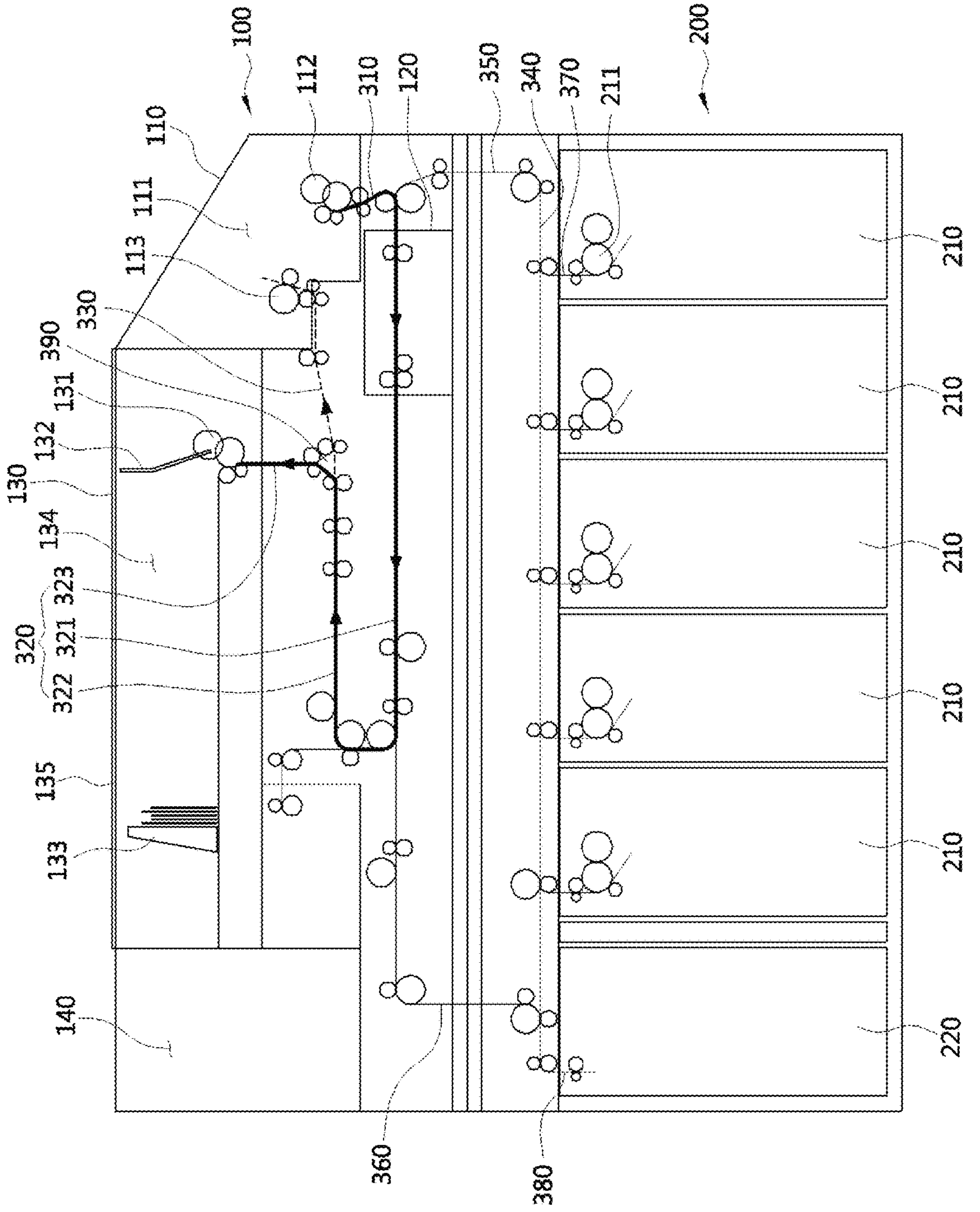
FIG. 2 is a diagram showing a medium conveyance path for counting and rejecting deposited media in a medium handling apparatus according to an exemplary embodiment of the present invention.

Deposited media counting and rejection processes will be described with reference to FIG. 2.

When a user inserts media into the internal space 111 of the deposit/withdrawal unit 110 for a deposit, the media are each individually separated by the separator 112 and then conveyed to the discrimination unit 120 through the first conveyance path 310.

Normal media discriminated by the discrimination unit 120 as normal are passed through the second conveyance path 320 (321, 322, and 323) and temporarily stored in the temporary storage unit 130 by the separator/accumulator 131 such that a deposited medium counting process is finished.

When a medium is discriminated as a reject medium by the discrimination unit 120, the direction of the three-way switch gate 390 is set so that the second upper conveyance path 322 and the third conveyance path 330 are connected. The reject medium discriminated by the discrimination unit 120 is passed through the second lower conveyance path 321, the second upper conveyance path 322, and the third conveyance path 330, is accumulated in the internal space 111 of the deposit/withdrawal unit 110 by the accumulator 113, and then is taken out by the user, such that a deposited medium rejection process is finished.

After the deposited medium counting process is performed as described above, a deposit reception process proceeds when the user inputs a deposit confirmation signal, and a deposit cancellation process proceeds when the user inputs a deposit cancellation signal.

When the deposit cancellation signal is input, the direction of the three-way switch gate 390 is set so that the second upper connective conveyance path 323 and the third conveyance path 330 are connected. The media temporarily stored in the temporary storage unit 130 are each individually separated by the separator/accumulator 131, passed through the second upper connective conveyance path 323 and the third conveyance path 330, accumulated in the internal space 111 of the deposit/withdrawal unit 110, and then taken out by the user, such that a deposit process is finished.

Figure 3:
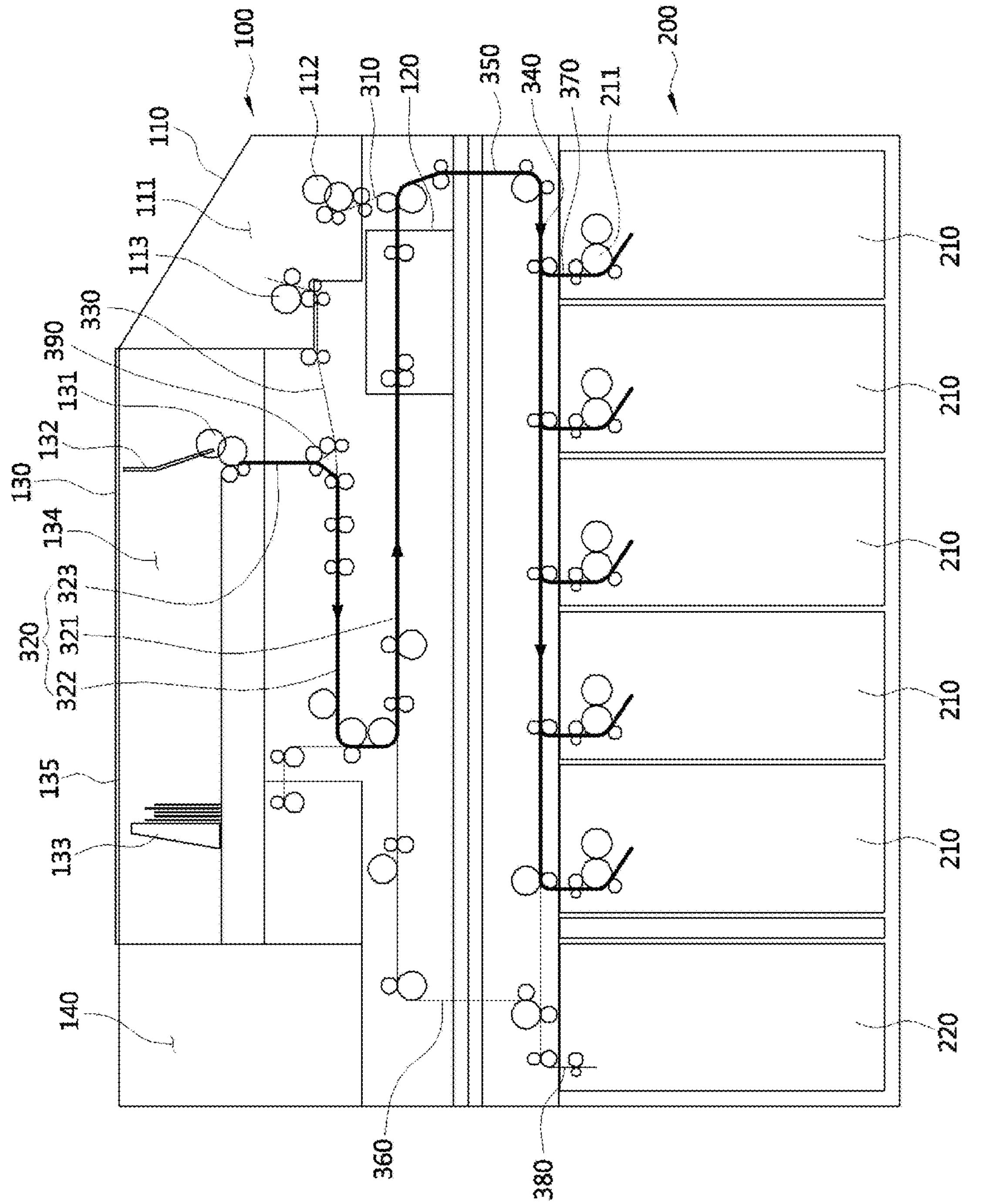
FIG. 3 is a diagram showing a medium conveyance path for receiving deposited media in a medium handling apparatus according to an exemplary embodiment of the present invention.

A deposit reception process will be described with reference to FIG. 3.

When the deposit reception process proceeds, the direction of the three-way switch gate 390 is set so that the second upper connective conveyance path 323 and the second upper conveyance path 322 are connected. The media temporarily stored in the temporary storage unit 130 are each individually separated by the separator/accumulator 131, passed through the second upper connective conveyance path 323, the second upper conveyance path 322, the second lower conveyance path 321, the discrimination unit 120, the first connective conveyance path 350, and the fourth conveyance path 340, and accumulated in a recycling cassette 210, such that a deposit process is finished. When a plurality of types of media are deposited, the media may be stored in a plurality of recycling cassettes according to type of media.

A withdrawal and rejection process will be described with reference to FIG. 4.

When a user makes a withdrawal request, the direction of the three-way switch gate 390 is set so that the second upper conveyance path 322 and the third conveyance path 330 are connected. Media stored in a recycling cassette 210 are each individually separated by a separator/accumulator 211.

Each individually separated medium is passed through the fourth conveyance path 340 and the first connective conveyance path 350, and the discrimination unit 120 discriminates whether the media are abnormal. Media discriminated to be normal media by the discrimination unit 120 are passed through the second lower conveyance path 321, the second upper conveyance path 322, and the third conveyance path 330 and accumulated in the internal space 111 by the accumulator 113 of the deposit/withdrawal unit 110. The media accumulated in the internal space 111 are taken out by the user such that a withdrawal process is finished.

Figure 4:
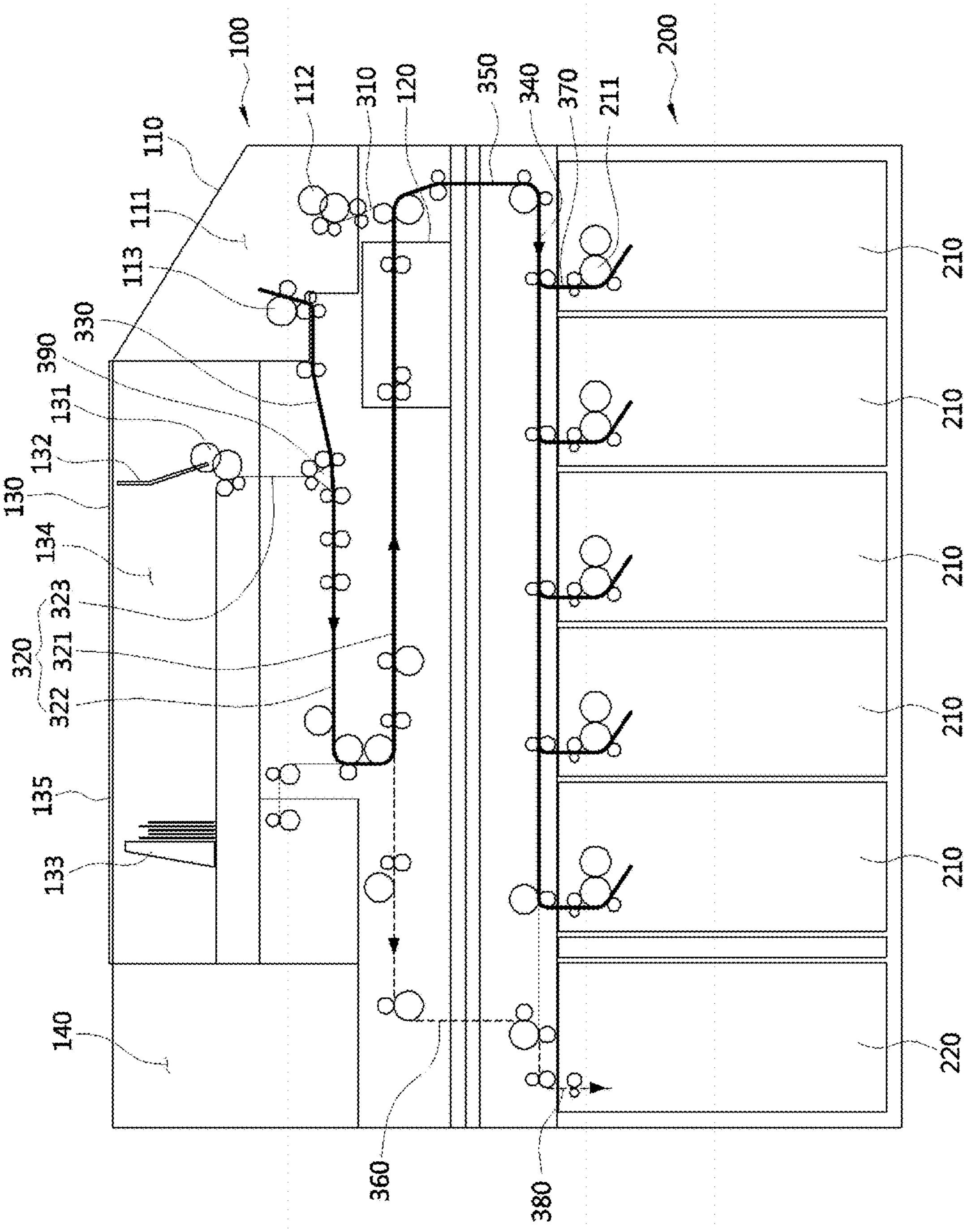
FIG. 4 is a diagram showing a medium conveyance path for a withdrawal in a medium handling apparatus according to an exemplary embodiment of the present invention.

A medium discriminated as a reject medium by the discrimination unit 120 is directly conveyed to the reject cassette 220 through the second lower conveyance path 321 and the second connective conveyance path 360 as indicated by the path of the broken line in FIG. 4.

As described above, the second connective conveyance path 360 diverged from the second conveyance path 320 is provided in the rear portion of the ATM, and the reject cassette 220 is disposed behind the recycling cassettes 210. Therefore, when a medium to be withdrawn is rejected, the reject medium may be discriminated by the discrimination unit 120 and then directly stored in the reject cassette 220 without being temporarily stored. Consequently, it is possible to reduce a handling time of the reject medium and shorten a conveyance path of the reject medium.

Figure 5:
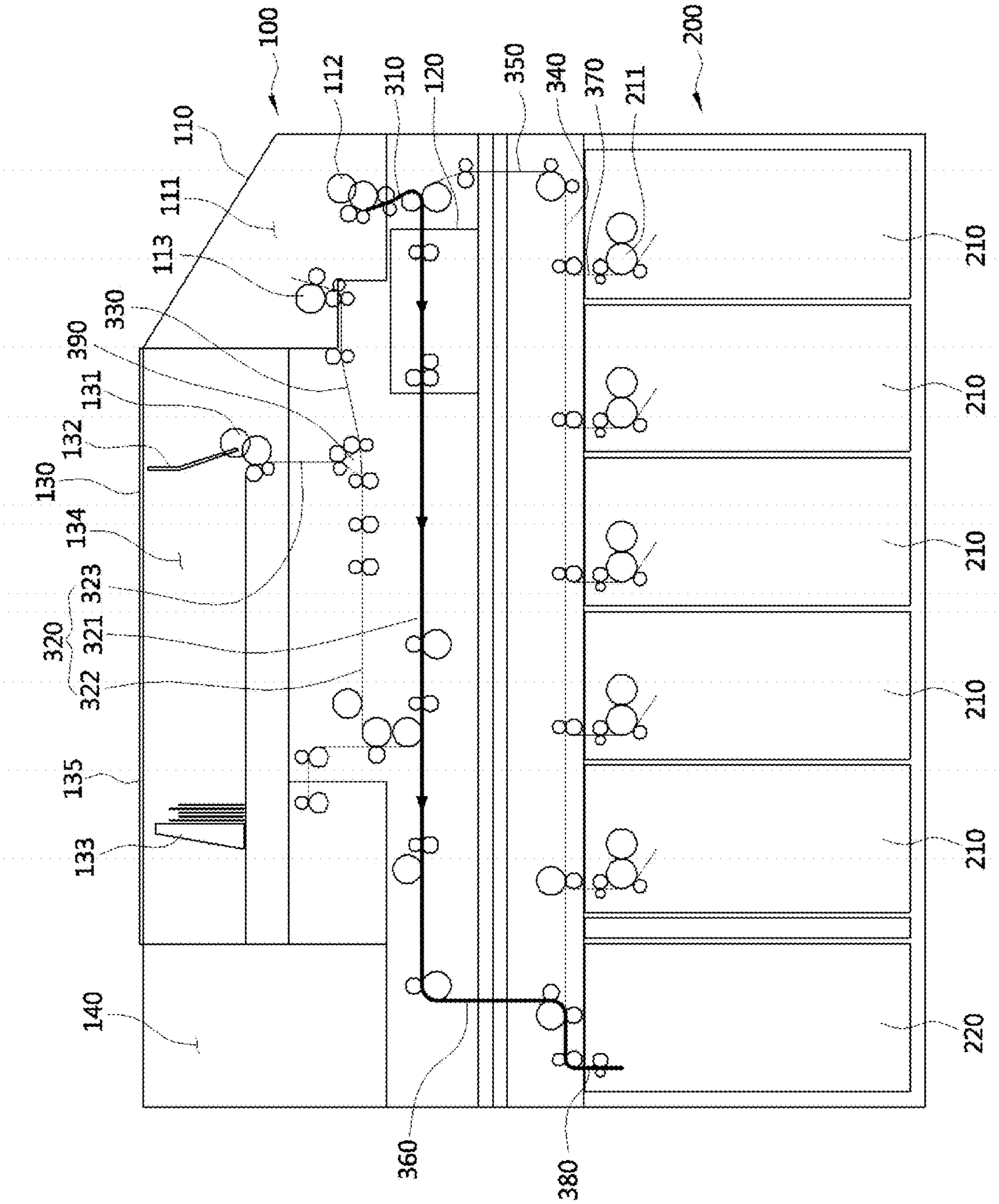
FIG. 5 is a diagram showing a medium conveyance path for retrieving lost media in a medium handling apparatus according to an exemplary embodiment of the present invention.

Retrieval of lost media will be described with reference to FIG. 5.

When a user forgets to take out media accumulated in the internal space 111 of the deposit/withdrawal unit 110 in a withdrawal process, the media become lost medium. In this case, the media are each individually separated by the separator 112, passed through the first conveyance path 310, the discrimination unit 120, the second lower conveyance path 321, and the second connective conveyance path 360, and stored in the reject cassette 220.

An internal tallying process will be described with reference to FIGS. 6 and 7.

First, a user inputs a signal for tallying the number of media stored in the recycling cassettes 210.

Figure 6:
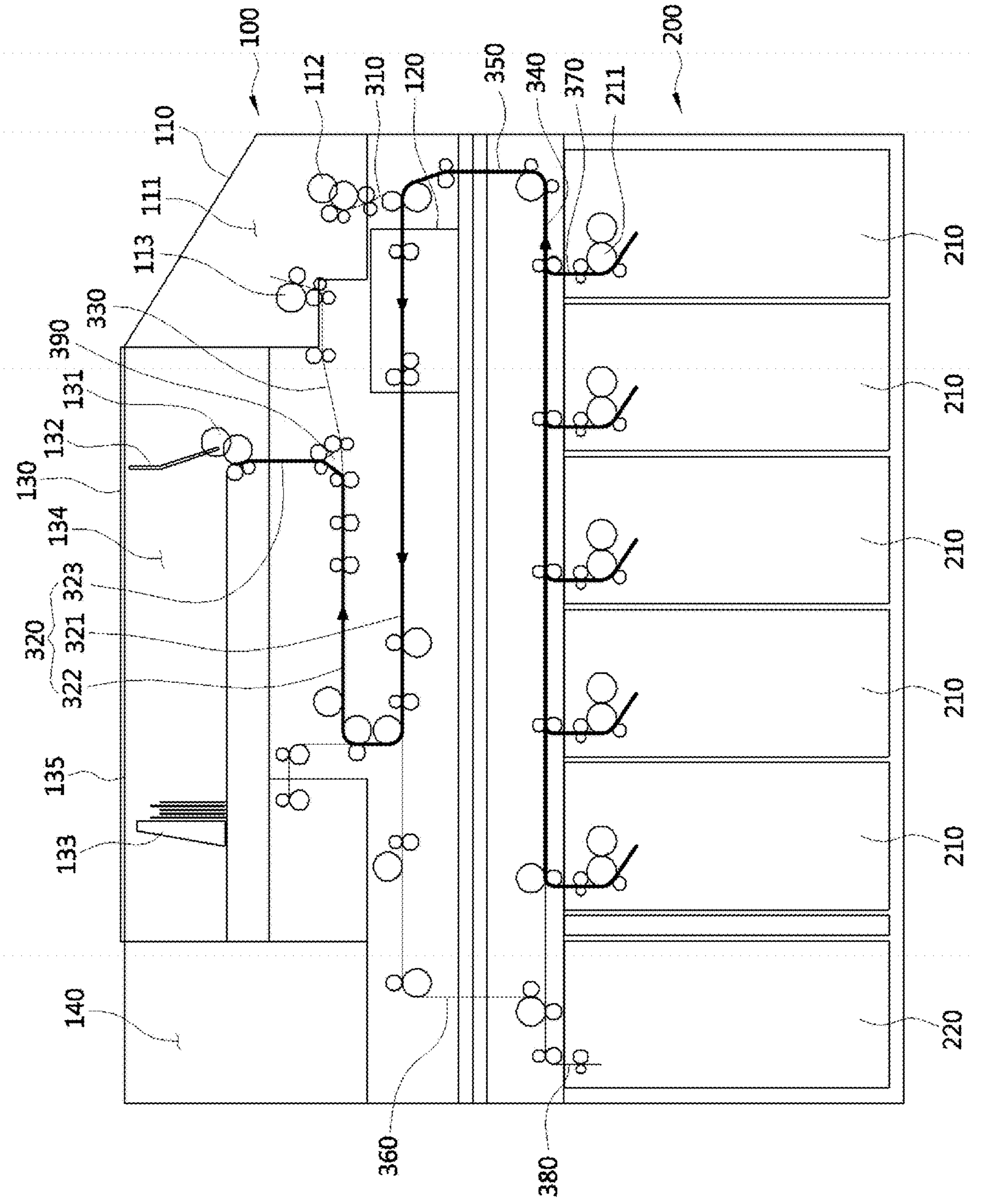
FIG. 6 is a diagram showing a medium conveyance path for a retrieval during internal tallying in a medium handling apparatus according to an exemplary embodiment of the present invention.

When the tallying signal is input, media are each individually separated by a separator/accumulator 211 in any one of the plurality of recycling cassettes 210, passed through the fourth conveyance path 340, and conveyed to the discrimination unit 120 as shown in FIG. 6, and the media are discriminated by the discrimination unit 120.

Media passed through the discrimination unit 120 are passed through the second lower conveyance path 321, the second upper conveyance path 322, and the second upper connective conveyance path 323, and stored in the temporary storage unit 130.

Figure 7:
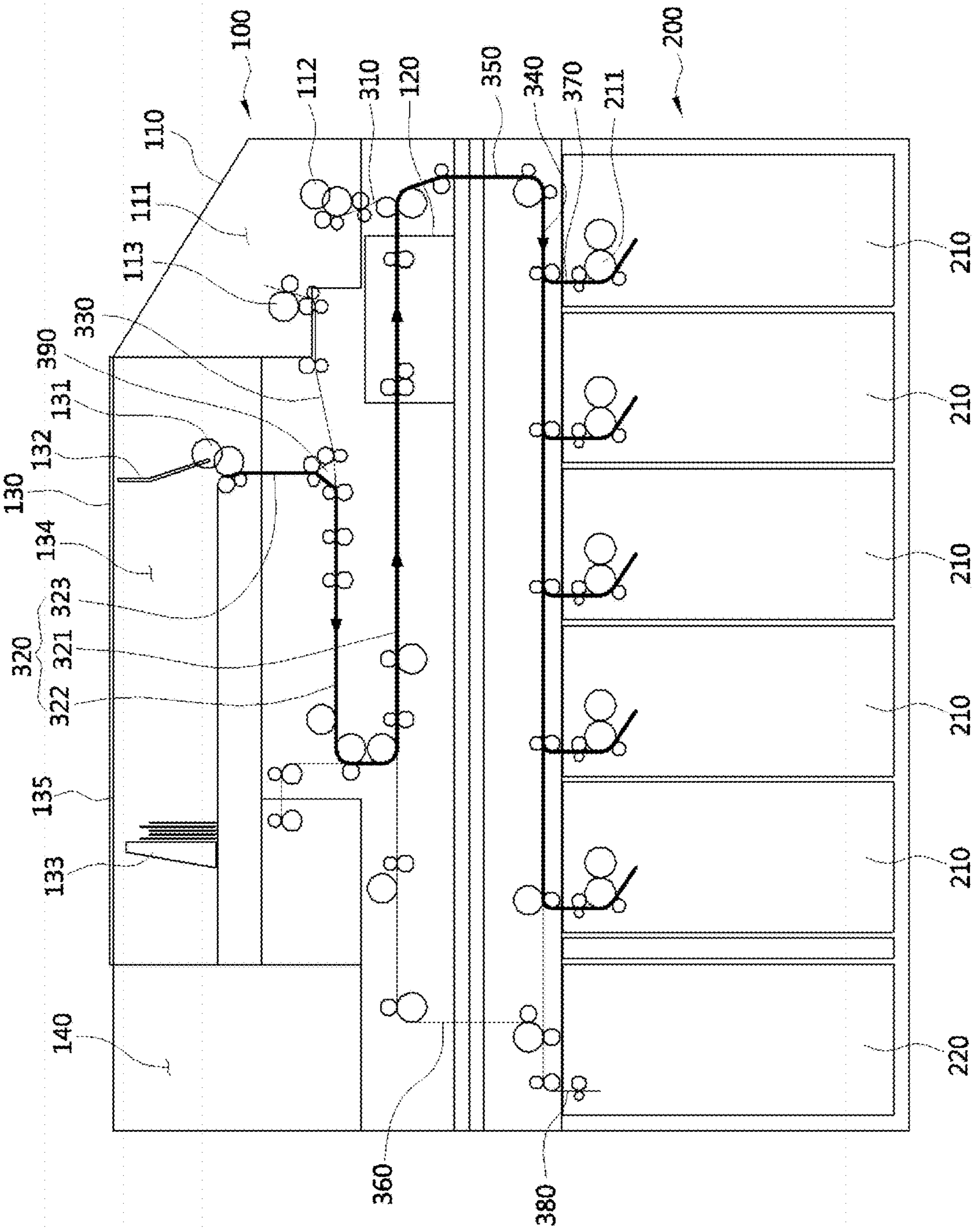
FIG. 7 is a diagram showing a medium conveyance path for internal tallying in a medium handling apparatus according to an exemplary embodiment of the present invention.

When all the media of the recycling cassette 210, which is a tallying target, are stored in the temporary storage unit 130 through such a process, the media of the temporary storage unit 130 are separated again and passed through the second upper connective conveyance path 323, the second upper conveyance path 322, the second lower conveyance path 321, the discrimination unit 120, and the fourth conveyance path 340, and stored in the recycling cassette 210, which is the tallying target, as shown in FIG. 7.

In this case, the number of media may be sensed by the discrimination unit 120, or a sensor provided in the conveyance path 320 or 340 may sense whether media are passed through.

When the number of media of the recycling cassette 210, which is the tallying target, is determined through the above process, the number may be displayed on a display (not shown) so that the user may see the number.

When tallying of the recycling cassette 210 is completed as described above, tallying of the other recycling cassettes 210 is performed through the same process.

Next, a process of refilling a recycling cassette 210 with media due to a deficient number of media will be described.

In a method of refilling media, the deposit/withdrawal unit 110 or the temporary storage unit 130 may be used.

First, when a user wants to refill a recycling cassette 210 with media by using the deposit/withdrawal unit 110, the user inserts media into the deposit/withdrawal unit 110. The inserted media are separated one by one, passed through the first conveyance path 310, and discriminated by the discrimination unit 120. After being discriminated, normal media are stored in the temporary storage unit 130, and the media stored in the temporary storage unit 130 are stored in the recycling cassette 210, such that the recycling cassette 210 is refilled with the media. In this case, a conveyance path of the media is the same as that shown in FIGS. 2 and 3.

Next, when a user wants to refill a recycling cassette 210 with media by using the temporary storage unit 130, the user opens the door 135 provided in the temporary storage unit 130 and inserts media for refilling the internal space 134.

The media in the internal space 134 are separated, passed through the second upper connective conveyance path 323, the second upper conveyance path 322, and the second lower conveyance path 321, and conveyed to the discrimination unit 120 such that the media are discriminated. Media discriminated as normal media are passed through the first connective conveyance path 350 and the fourth conveyance path 340 and stored in the recycling cassette 210 to be refilled. In this case, a conveyance path of the media is the same as that shown in FIG. 3. A medium discriminated as reject medium by the discrimination unit 120 is passed through the first connective conveyance path 350 and the fourth conveyance path 340 and stored in the reject cassette 220.

As described above, according to exemplary embodiments of the present invention, by using a temporary storage unit, it is possible to perform a tallying task even when there is no empty cassette in an ATM, such that the internal space of the ATM can be efficiently used.

The invention claimed is:

1. A medium handling method of a medium handling apparatus, the method comprising:

during a media counting and rejection process, receiving media from a user into internal space of a deposit/withdrawal unit;

during the media counting and rejection process, determining normal media and reject medium of the received media by a discrimination unit;

during the media counting and rejection process, receiving the normal media via a separator/accumulator of a temporary storage unit, the separator/accumulator located below a first fixed plate and located closer to the deposit/withdrawal unit than a rear side of the medium handling apparatus to enable extension of the temporary storage unit to the rear side of the medium handling apparatus;

during the media counting and rejection process, storing the received normal media between the first fixed plate and a second plate of the temporary storage unit by moving the second plate of the temporary storage unit backward or forward after determination by the discrimination unit, the second plate located further away from the separator/accumulator than the first fixed plate;

during the media counting and rejection process, returning the reject medium to the deposit/withdrawal unit without storing in the temporary storage unit;

during a deposit receipt process subsequent to the media counting and rejection process, sending the normal media in the temporary storage unit to recycling cassettes according to types of the normal media;

receiving a signal for tallying numbers of media stored in each of the recycling cassettes to initiate an internal tallying process;

during the internal tallying process, separating stored media in the recycling cassette and conveying the separated media from the recycling cassettes to the discrimination unit;

during the internal tallying process, discriminating the separated media from the recycling cassettes through the discrimination unit, and storing the numbers of the separated media in a controller;

during the internal tallying process, storing, in the temporary storage unit by moving the second plate of the temporary storage unit backward or forward to accommodate the media between the first fixed plate and the second plate, the media from the recycling cassettes passed through the discrimination unit;

after storing the media in the temporary storage unit in the internal tallying, sensing the number of media stored in the temporary storage unit by separating and passing the media of the temporary storage unit through the discrimination unit to one or more of the recycling cassettes for storage;

displaying the numbers of separated media as sensed in the internal tallying;

receiving first additional media in the temporary storage unit by moving the second plate backward or forward to accommodate the first additional media between the first fixed plate and the second plate; and sending normal media of the first additional media from the temporary storage unit to the recycling cassettes for refilling the recycling cassettes.

2. The medium handling method of claim 1, further comprising, responsive to receiving input to refill the recycling cassette:

receiving additional media in the deposit/withdrawal unit, separating each individual inserted media, passing the additional media through the discrimination unit to determine normal media and reject media of the additional media, storing the normal media of the additional media in the temporary storage unit after being discriminated through the discrimination unit, and sending the normal media of the additional media from the temporary storage unit to the recycling cassettes for storage.

3. The medium handling method of claim 2, further comprising, storing the reject medium in a reject cassette during the media counting and rejection process.

4. The medium handling method of claim 1, wherein the first additional media is received via an opening door at a top of the temporary storage unit.

5. The medium handling method of claim 1, further comprising storing media loaded into the deposit/withdrawal unit but not retrieved by the user.

6. The medium handling method of claim 4, further comprising, receiving second additional media via the deposit/withdrawal unit; and sending normal media of the second additional media from the deposit/withdrawal unit to the recycling cassettes for refilling the recycling cassettes.

7. The medium handling method of claim 1, wherein the temporary storage unit has a capacity to accumulate the stored media of at least one of the recycling cassettes.

* * * * *